US009922088B2

(12) United States Patent
Nica

(10) Patent No.: US 9,922,088 B2
(45) Date of Patent: Mar. 20, 2018

(54) CARDINALITY ESTIMATION USING SPANNING TREES

(71) Applicant: Anisoara Nica, Waterloo (CA)

(72) Inventor: Anisoara Nica, Waterloo (CA)

(73) Assignee: SYBASE, INC., Dublin, CA (US)

( * ) Notice: Subject to any disclaimer, the term of this patent is extended or adjusted under 35 U.S.C. 154(b) by 647 days.

(21) Appl. No.: 14/145,777

(22) Filed: Dec. 31, 2013

(65) Prior Publication Data

US 2015/0186461 A1   Jul. 2, 2015

(51) Int. Cl.
*G06F 17/30* (2006.01)

(52) U.S. Cl.
CPC ................ *G06F 17/30469* (2013.01)

(58) Field of Classification Search
CPC ......... G06F 17/30466; G06F 17/30469; G06F 17/30471
See application file for complete search history.

(56) References Cited

U.S. PATENT DOCUMENTS

| | | | |
|---|---|---|---|
| 5,412,806 A | 5/1995 | Du et al. |
| 5,515,502 A | 5/1996 | Wood |
| 5,761,653 A | 6/1998 | Schiefer et al. |
| 5,918,225 A | 6/1999 | White et al. |
| 5,951,695 A | 9/1999 | Kolovson |
| 5,956,706 A | 9/1999 | Carey et al. |
| 6,105,020 A | 8/2000 | Lindsay et al. |
| 6,189,142 B1 | 2/2001 | Johnston et al. |
| 6,516,310 B2 | 2/2003 | Paulley |
| 6,694,507 B2 | 2/2004 | Arnold et al. |
| 6,801,905 B2 | 10/2004 | Andrei |
| 6,928,580 B2 | 8/2005 | Pedone et al. |
| 6,947,927 B2 | 9/2005 | Chaudhuri et al. |
| 7,146,363 B2 | 12/2006 | Waas et al. |
| 7,171,408 B2 | 1/2007 | Zuzarte |
| 7,299,226 B2 | 11/2007 | Bruno et al. |
| 7,305,421 B2 | 12/2007 | Cha et al. |
| 7,318,066 B2 | 1/2008 | Kaufman et al. |
| 7,337,167 B2 | 2/2008 | Muras |
| 7,447,710 B2 | 11/2008 | Sampath et al. |
| 7,546,598 B2 | 6/2009 | Blumenthal et al. |
| 7,549,079 B2 | 6/2009 | Connolly et al. |
| 7,558,748 B2 | 7/2009 | Ehring et al. |

(Continued)

OTHER PUBLICATIONS

Non-Final Office Action for U.S. Appl. No. 14/157,016, dated Jul. 20, 2015; 9 pages.

(Continued)

*Primary Examiner* — Dinku Gebresenbet
(74) *Attorney, Agent, or Firm* — Sterne, Kessler, Goldstein & Fox P.L.L.C.

(57) ABSTRACT

A system, computer-implemented method, and computer-program product embodiments for determining a cardinality estimate for a query. A cardinality estimator identifies a predicate in a query, where the predicate is split into a plurality of equivalence classes. The cardinality estimator then generates a plurality of equivalence graphs from the plurality of equivalence classes, one equivalence graph for an equivalence class. Spanning trees are identified from the plurality of equivalence graphs, and the cardinality estimator then determines the cardinality estimate for the query from the spanning trees.

16 Claims, 12 Drawing Sheets

(56) References Cited

U.S. PATENT DOCUMENTS

| | | |
|---|---|---|
| 7,644,397 B2 | 1/2010 | Warren et al. |
| 7,657,718 B1 | 2/2010 | LeCrone et al. |
| 7,689,989 B2 | 3/2010 | Dostert et al. |
| 7,904,889 B2 | 3/2011 | Avitzur et al. |
| 7,917,502 B2 | 3/2011 | Cheng et al. |
| 7,933,869 B2 | 4/2011 | Becker et al. |
| 7,979,421 B2 | 7/2011 | Radestock et al. |
| 8,027,952 B2 | 9/2011 | Kern et al. |
| 8,086,598 B1 * | 12/2011 | Lamb ............... G06F 17/30466 707/606 |
| 8,103,635 B2 | 1/2012 | Lee et al. |
| 8,121,978 B2 | 2/2012 | Wiss et al. |
| 8,126,870 B2 | 2/2012 | Chowdhuri et al. |
| 8,196,104 B2 | 6/2012 | Cohrs et al. |
| 8,200,634 B2 | 6/2012 | Driesen et al. |
| 8,234,633 B2 | 7/2012 | Schneider et al. |
| 8,255,369 B2 | 8/2012 | Luo et al. |
| 8,281,014 B2 | 10/2012 | Stanev et al. |
| 8,336,023 B2 | 12/2012 | Kuzsma et al. |
| 8,356,010 B2 | 1/2013 | Driesen |
| 8,386,431 B2 | 2/2013 | Hahn et al. |
| 8,417,669 B2 | 4/2013 | Xu et al. |
| 8,442,952 B1 | 5/2013 | Armangau et al. |
| 8,448,137 B2 | 5/2013 | Kaetker et al. |
| 8,522,217 B2 | 8/2013 | Dutta et al. |
| 8,627,317 B2 | 1/2014 | Altman et al. |
| 8,645,922 B2 | 2/2014 | Zeort |
| 8,745,622 B2 | 6/2014 | Mewhinney et al. |
| 8,874,508 B1 | 10/2014 | Mittal |
| 9,058,371 B2 | 6/2015 | Thomsen et al. |
| 9,195,765 B2 | 11/2015 | Russell et al. |
| 9,213,365 B2 | 12/2015 | Sirpal et al. |
| 9,213,728 B2 | 12/2015 | Engelko et al. |
| 9,239,868 B2 | 1/2016 | Neerincx et al. |
| 2005/0131914 A1 | 6/2005 | Abdo et al. |
| 2006/0288332 A1 | 12/2006 | Sagar et al. |
| 2007/0124347 A1 | 5/2007 | Vivian et al. |
| 2009/0171921 A1 | 7/2009 | Kirk et al. |
| 2010/0223276 A1 * | 9/2010 | Al-Shameri ...... G06F 17/30333 707/769 |
| 2011/0029508 A1 * | 2/2011 | Al-Omari ......... G06F 17/30433 707/718 |
| 2012/0278307 A1 * | 11/2012 | Cole ................ G06F 17/30466 707/714 |
| 2015/0149441 A1 | 5/2015 | Nica et al. |
| 2015/0199262 A1 | 7/2015 | Bhaysar et al. |
| 2015/0301910 A1 | 10/2015 | Sathyanarayana et al. |

OTHER PUBLICATIONS

Final Office Action for U.S. Appl. No. 14/157,016, dated Apr. 19, 2016; 9 pages.
Notice of Allowance for U.S. Appl. No. 14/256,639, dated Mar. 28, 2016; 5 pages.
Non-Final Office Action for U.S. Appl. No. 14/256,639, dated Sep. 29, 2015; 8 pages.
Extended European Search Report for European Application No. 14003672, dated Mar. 24, 2015; 7 pages.

* cited by examiner

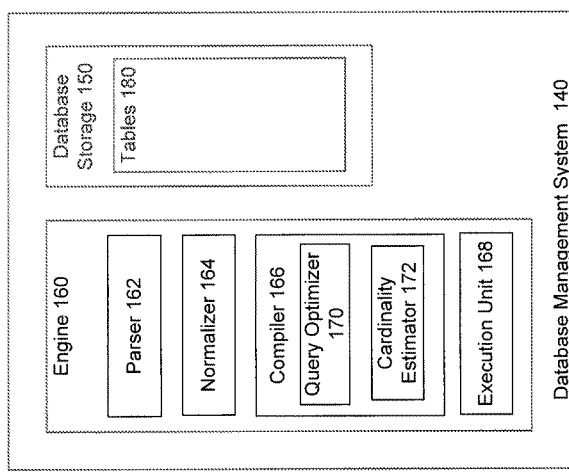
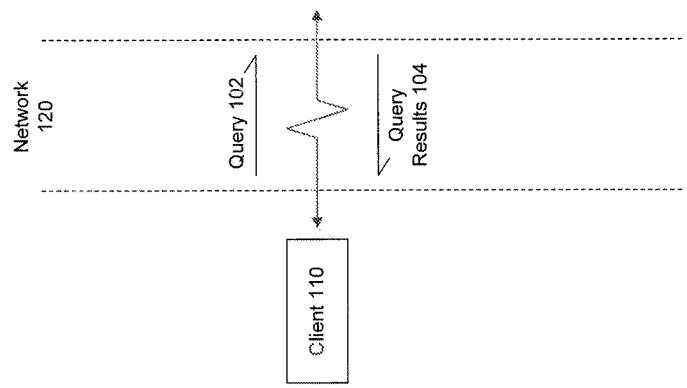
FIG. 1

600

*STCardinality($Q_0$)* ALGORITHM

1. COMMENT: given a query $Q_0$ build the minimum spanning trees and use them to compute cardinality of $Q_0$

- 2. For a given general query $Q_0 = \sigma_x(R_1 \bowtie \cdots \bowtie R_n)$, rewrite the predicate $x$ (e.g., infer new predicates to complete join equivalence classes, normalize the predicate $x$) such that $Q_0 = \sigma_{x'}(\underbrace{(\sigma_s(R_1 \bowtie \cdots \bowtie R_n)}_{Q}$ where the predicate $s$ can be split into $e$ join equivalence classes. If such a rewrite doesn't exist then *STCardinality* Algorithm cannot be applied.

- 3. $card(Q_0) = f(selectivity(s), selectivity(x'), cardinality(R_1), \ldots, cardinality(R_n))$ where $selectivity(s) = STSelectivity(Q)$ and $f()$ is a function which combines $selectivity(s)$ (among other selectivities) and the size of relations $R_i$ to compute the cardinality for the whole query $Q_0$.

$min\mathcal{E}(Q)$ ALGORITHM
1. COMMENT: given a query $Q$, find a minimum set of equivalence classes $\{\mathcal{E}(s_1),\ldots,\mathcal{E}(s_c)\}$
2. INPUT: a query $Q = \sigma_s(R_1 \bowtie \cdots \bowtie R_n)$ which can be decomposed into equivalence classes
3. OUTPUT: the minimum set of equivalence classes $\{\mathcal{E}(s_1),\ldots,\mathcal{E}(s_c)\}$ for the query $Q$
4. STEP 1: let $s = \wedge_i(p_i)$ and $preds(s) = \{p_i\}_i$ ▷ $preds(s)$ are all the join predicates in $Q$
5. STEP 2: let $V = \emptyset$; ∀ attributes $X$, $rels(X) = \emptyset$, $preds(X) = TRUE$, $const(X) = null$
6. STEP 3: $\forall p \in preds(s)$ do

- 7. $rels(X) = rels(X) \cup \{T,S\}$ if $p$ is of the form $T.X = S.X$
- 8. $preds(X) = preds(X) \cup \{p\}$
- 9. $rels(X) = rels(X) \cup \{T\}$ if $p$ is of the form $T.X = cA$
- 10. $const(X) = cA$ if $p$ is of the form $T.X = cA$
- 11. $V = V \cup \{\{X\}\}$ 12. STEP 4: until $V$ is not changed do: ▷ combine equivalence classes if possible

- 13. $\forall A, B \in V$ if $rels(A) \cap rels(B)$ has more than one element then:
    - 14. $V = V \cup \{\{A,B\}\}$
    - 15. $rels(\{A,B\}) = rels(A) \cap rels(B)$
    - 16. $const(\{A,B\}) = null$ if any $const(A)$ or $const(B)$ is null
    - 17. $const(\{A,B\}) = \{const(A), const(B)\}$ is both $const(A)$ and $const(B)$ are not $null$
    - 18. $preds(\{A,B\}) = preds(A)_{rels(\{A,B\}),const(\{A,B\})} \cup preds(B)_{rels(\{A,B\}),const(\{A,B\})}$
    - 19. for $X \in \{A,B\}$, if $rels(X) \subset rels(\{A,B\})$ and $const(X) \subset const(\{A,B\})$ then remove $X$ from $V$: $V = V \setminus \{B\}$ 20. STEP 5: $V$ contains the minimum set of equivalence classes:
21. $min\mathcal{E}(Q) = \emptyset$
22. $\forall A \in V$ do:
23. $p = \wedge_{q \in preds(A)} q$
24. $\mathcal{E}(p) = \{rels(A), const(A)\}$ 25. $min\mathcal{E}(Q) = min\mathcal{E}(Q) \cup \{\mathcal{E}(p)\}$
26. STEP 6: RETURN $min\mathcal{E}(Q)$

*STSelectivity(Q)* ALGORITHM
1. INPUT: A query $Q = \sigma_s(R_1 \bowtie \cdots \bowtie R_n)$ where the predicate $s$ can be split into $e$ equivalence classes
2. OUTPUT: Estimated selectivity of the predicate $s$: *selectivity(s)*
3. STEP 1: Find the minimum set of equivalence classes $min\mathcal{E}(Q) = \{\mathcal{E}(s_1), \ldots, \mathcal{E}(s_e)\}$
4. STEP 2: Build the corresponding forest of join equivalence graphs, one graph for each join equivalence class $\mathcal{E}(s_i)$.
5. STEP 3: On the forest $\{G(\mathcal{E}(s_1)), \ldots, G(\mathcal{E}(s_e))\}$ find the 'best' spanning trees for the cardinality estimation:
6. $bestSTs(\{G(\mathcal{E}(s_1)), \ldots, G(\mathcal{E}(s_e))\}) = \{T(G(\mathcal{E}(s_1))), \ldots, T(G(\mathcal{E}(s_e)))\}$
7. STEP 4: The selectivity estimation of the predicate $s$ is computed as follows:
$selectivity(s) = \prod_{e \in Edges(\{T(G(\mathcal{E}(s_1))), \ldots, T(G(\mathcal{E}(s_e)))\})} selectivity(e)$
8. STEP 5: RETURN *selectivity(s)*

$STSelectivity(Q, \{R_{i_1}, \ldots, R_{i_t}\})$ ALGORITHM
1. INPUT: A query $Q = \sigma_s(R_1 \bowtie \cdots \bowtie R_n)$ where the predicate $s$ can be split into $e$ equivalence classes
2. INPUT: A subset of table $\{R_{i_1}, \ldots, R_{i_t}\} \subseteq \{R_1, \ldots, R_n\}$
3. OUTPUT: Estimated selectivity of the sub-predicate $s'$ of $s$ where $s'$ contains all the predicates on the subset $\{R_{i_1}, \ldots, R_{i_t}\}$
4. STEP 1: Find the minimum set of equivalence classes for $Q$ $min\mathcal{E}(Q) = \{\mathcal{E}(s_1), \ldots, \mathcal{E}(s_e)\}$
5. STEP 2: Build the corresponding forest of join equivalence graphs, one graph for each join equivalence class $\mathcal{E}(s_i)$
6. STEP 3: For each $G(\mathcal{E}(s_i))$ compute the vertex-induced subgraph $G'(\mathcal{E}(s_i))$ by the vertices $\{R_{i_1}, \ldots, R_{i_t}\}$. Note that some of these subgraphs maybe empty set for graphs which don't contain any of the vertices $\{R_{i_1}, \ldots, R_{i_t}\}$.
7. STEP 4: On the new forest $\{G'(\mathcal{E}(s_1)), \ldots, G'(\mathcal{E}(s_e))\}$ find the 'best' spanning trees for cardinality estimation:
8. $bestSTs(\{G'(\mathcal{E}(s_1)), \ldots, G'(\mathcal{E}(s_e))\}) = \{\mathcal{T}(G'(\mathcal{E}(s_1))), \ldots, \mathcal{T}(G'(\mathcal{E}(s_e)))\}$
9. STEP 5: The selectivity estimation of the predicate $s$ is computed as follows:
$selectivity(s') = \prod_{e \in Edges(\{\mathcal{T}(G'(\mathcal{E}(s_1))), \ldots, \mathcal{T}(G'(\mathcal{E}(s_e)))\})} (selectivity(e))$
10. STEP 6: RETURN $selectivity(s')$

*bestSTs*($\{G(\mathcal{E}(s_1)), \ldots, G(\mathcal{E}(s_e))\}$) ALGORITHM
1. COMMENT: This function builds, based on quality (i.e., weights) of the edges, the spanning trees for the forest of join equivalence graphs.
2. INPUT: The forest of graphs of the minimum set of join equivalence classes of a query $Q$: $min\mathcal{E}(Q) = \{G(\mathcal{E}(s_1)), \ldots, G(\mathcal{E}(s_e))\}$
3. OUTPUT: The forest of the best spanning trees $\{\mathcal{T}(G(\mathcal{E}(s_1))), \ldots, \mathcal{T}(G(\mathcal{E}(s_e)))\}$
4. STEP 1: let $E = \cup_{i \in \{1,\ldots,e\}} Edges(G(\mathcal{E}(s_i)))$ ▷ all edges in all graphs
5. $\forall i \in \{1, \ldots, e\}$. $\mathcal{T}(G(\mathcal{E}(s_i))) = null$ ▷ initialize all spanning trees
6. STEP 2: while $E$ is not empty do

- 7. find $b \in E$, an edge still in $E$, with the best quality (i.e., smallest weight) using a function *betterQuality*($e_1, e_2$) comparing the quality of two edges

- 8. call *add*($d$) ▷ This call adds $d$ and its subsumed edges to the corresponding spanning trees 9. STEP 3: return the forest of spanning trees $\{\mathcal{T}(G(\mathcal{E}(s_1))), \ldots, \mathcal{T}(G(\mathcal{E}(s_e)))\}$

*add*($d$) FUNCTION
1. COMMENT: This function takes an edge $d$ and try to add it to the current spanning tree for its graph; the function also processes all subsumed edges by adding them to the corresponding spanning trees.
2. STEP 1: if $d \notin E$ RETURN
3. STEP 2:
4. let *graph*($d$) be the original graph containing the edge $b$, i.e., *graph*($d$) = $G(\mathcal{E}(s_i))$ for some $i \in \{1, \ldots, e\}$
5. let $\mathcal{T}(graph(d))$ be the current spanning tree corresponding to the graph $G(\mathcal{E}(s_i))$
6. add $d$ to the current spanning tree $\mathcal{T}(graph(d))$ if this will still be a tree
7. STEP 3: $E = E \setminus \{d\}$
8. STEP 4: let *subsumed*($d$) = $\{e' | e' \in E, e'$ is subsumed by $d\}$
9. STEP 5: $\forall d' \in subsumed(d)$ call *add*($d'$)
10. STEP 6: RETURN

*betterQuality*($e_1, e_2$) is a boolean function which compares the quality of two edges with the transitivity property (i.e., if *betterQuality*($e_1, e_2$) and *betterQuality*($e_2, e_3$) then *betterQuality*($e_1, e_3$)) and the subsumed property (i.e., if $e_1$ subsumed $e_2$ then *betterQuality*($e_1, e_2$)). Such function can be implemented using a property vector of the edges - e.g., the confidence level of the selectivity estimation for an edge; the quality of the selectivity estimation expressed as the properties of the join predicates - e.g., the type of relationship between the two tables - the join predicate is of the form "primary key = primary key" or "primary key = foreign key" or "foreign key = foreign key" or "unique constraint attributes = attributes" or "index attributes = attributes".

FIG. 10

CARDINALITY ESTIMATION USING SPANNING TREES

BACKGROUND

Field

The embodiments relate generally to databases and more specifically to query optimization using cardinality estimation.

Background

Computer databases have become a prevalent means for data storage and retrieval. A database user will commonly access the underlying data in a database using a Database Management System ("DBMS"). A user issues a query to the DBMS that conforms to a defined query language. When a DBMS receives a query, it determines a query plan for the query. Once determined, the DBMS then uses the query plan to execute the query. As part of determining an efficient query plan, a DBMS relies on cardinality estimates that estimate the sizes (i.e., how many rows) of queries and sub-queries. Cardinality estimates are used to assess the efficiency (e.g., cost) of the query plan before the query plan is executed.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the relevant art to make and use the embodiments.

FIG. 1 is an example database computing environment in which embodiments can be implemented.

Figure 3A:
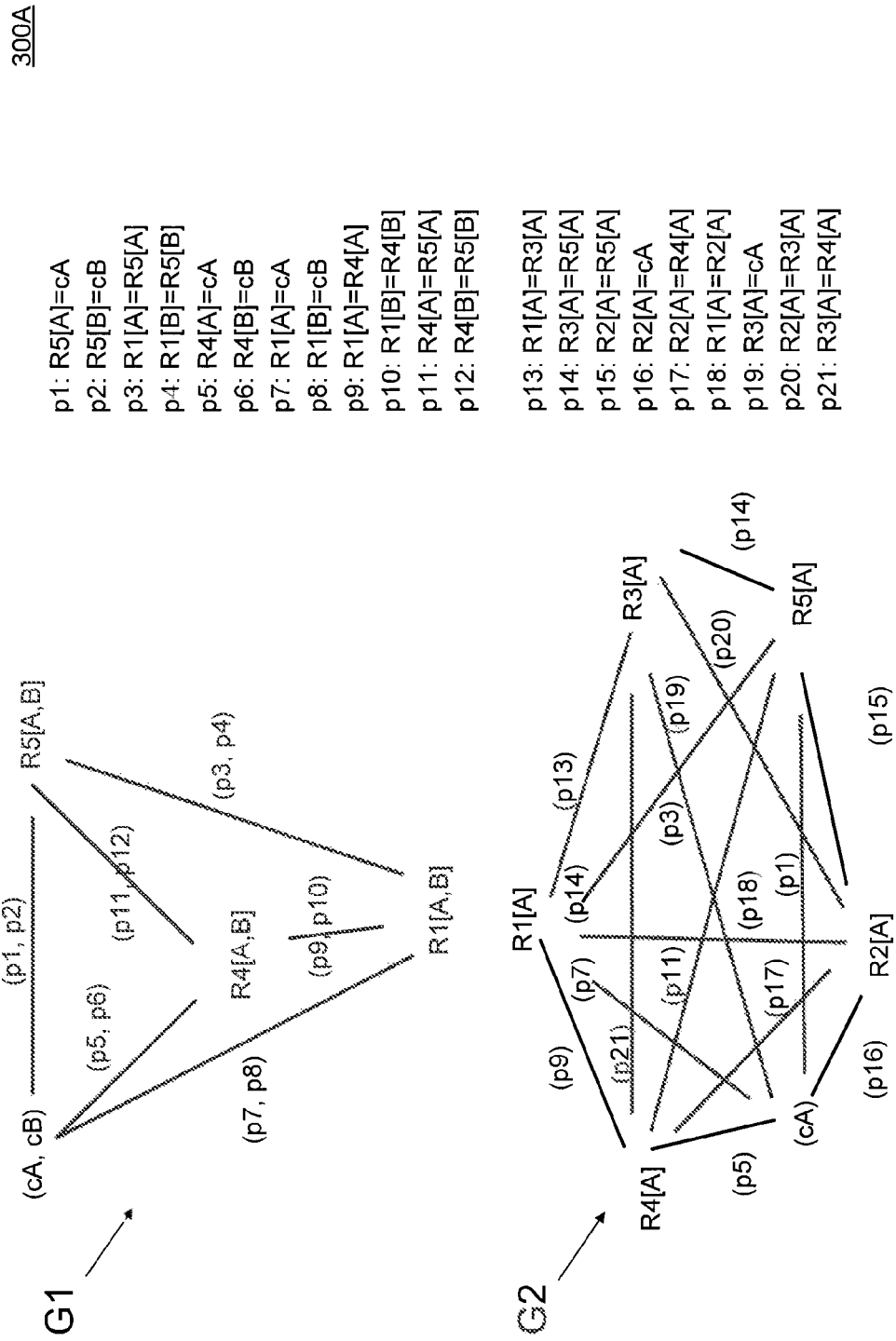
Figure 3B:
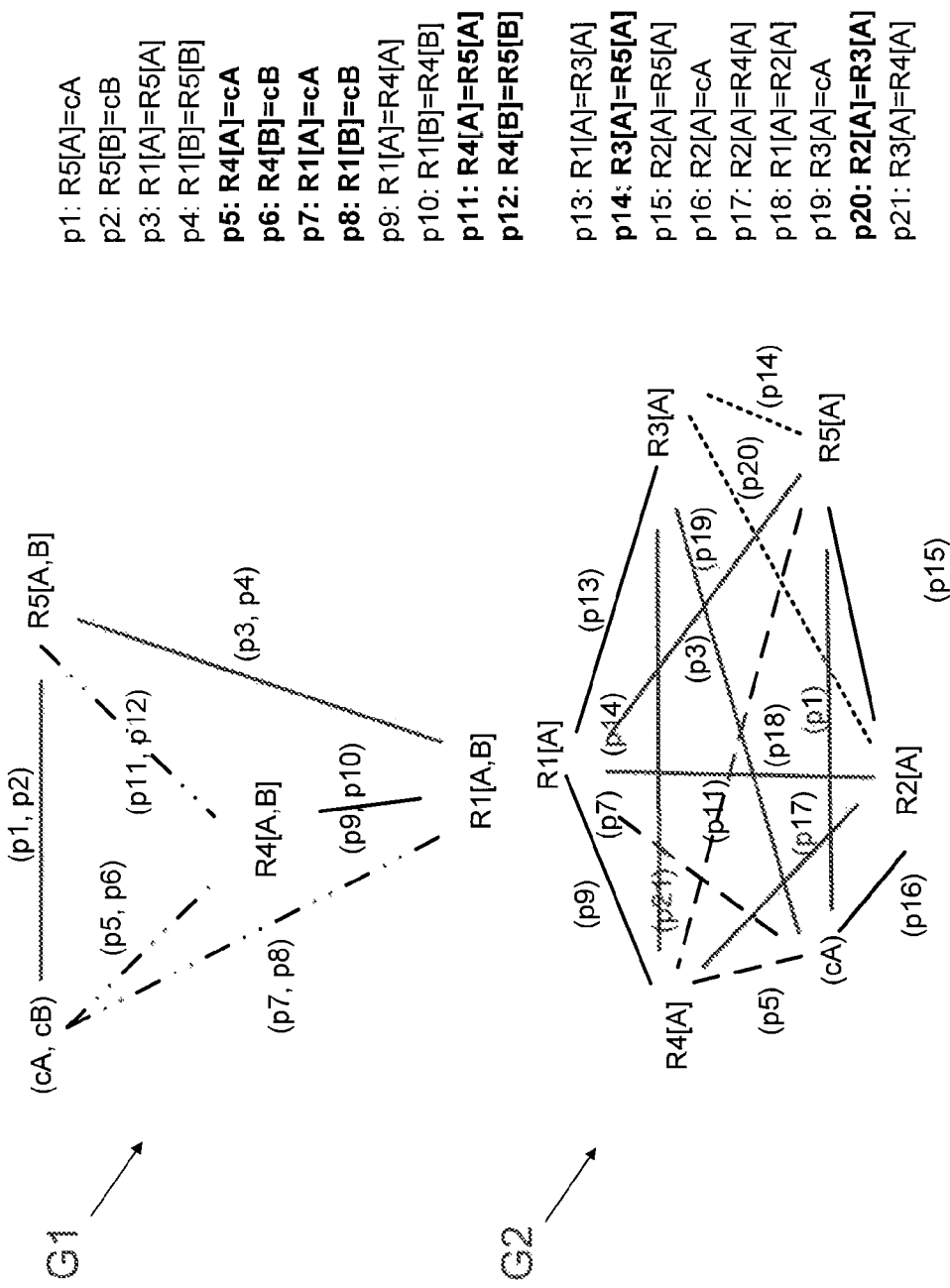

FIGS. 3A-B are diagrams of a forest of graphs corresponding to the join equivalence classes for a query and the minimum spanning trees in the forest of graphs, according to an embodiment.

Figure 4:
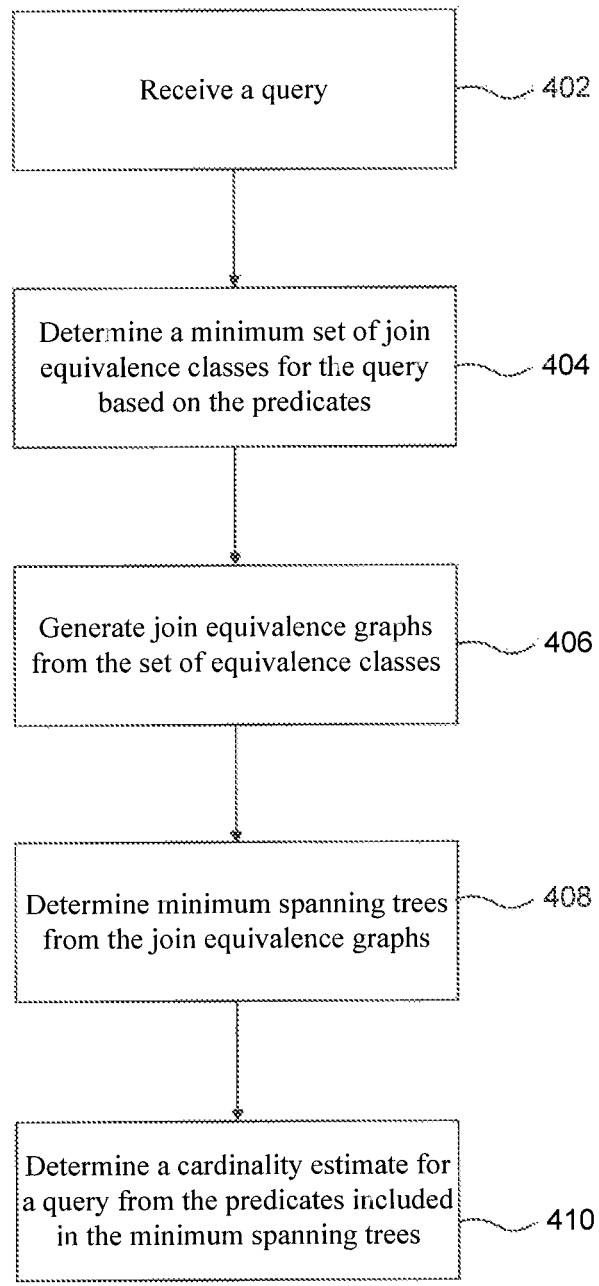

FIG. 4 is a flowchart of a method for generating a cardinality estimate for a query, according to an embodiment.

Figure 5:
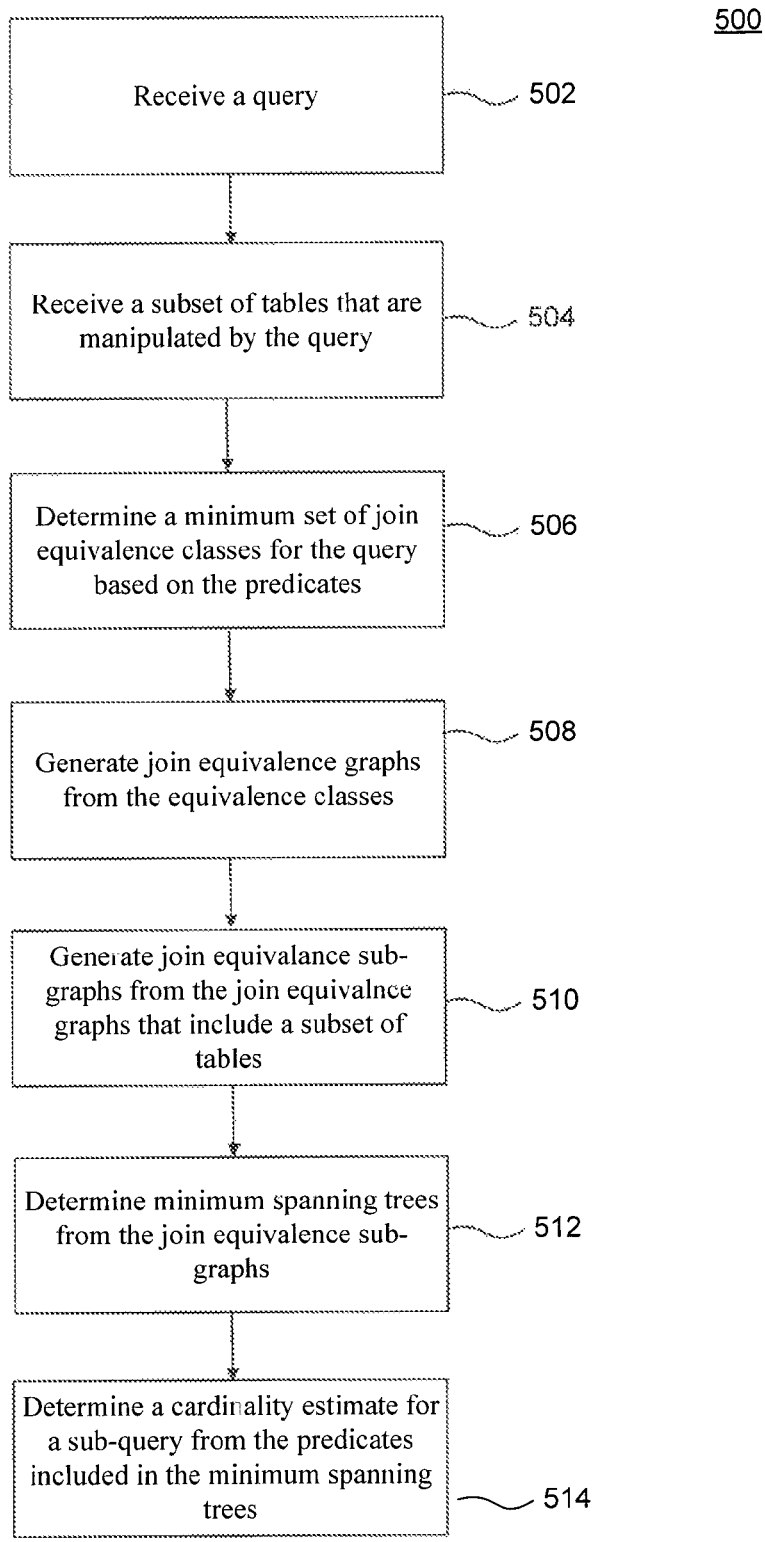

FIG. 5 is a flowchart of a method for generating a cardinality estimate for a sub-query, according to an embodiment.

FIG. 6 is a diagram of an algorithm for computing the cardinality of a query, according to an embodiment.

FIG. 7 is diagram of an algorithm for determining join equivalence classes for a query, according to an embodiment.

FIG. 8 is a diagram of an algorithm for computing a selectivity estimate for using spanning trees for a query, according to an embodiment.

FIG. 9 is a diagram of an algorithm for computing the selectivity estimate for using spanning trees for a sub-query, according to an embodiment.

FIG. 10 is a diagram of an algorithm for computing the minimum spanning trees for a graph forest of join equivalence classes, according to an embodiment.

Figure 11:
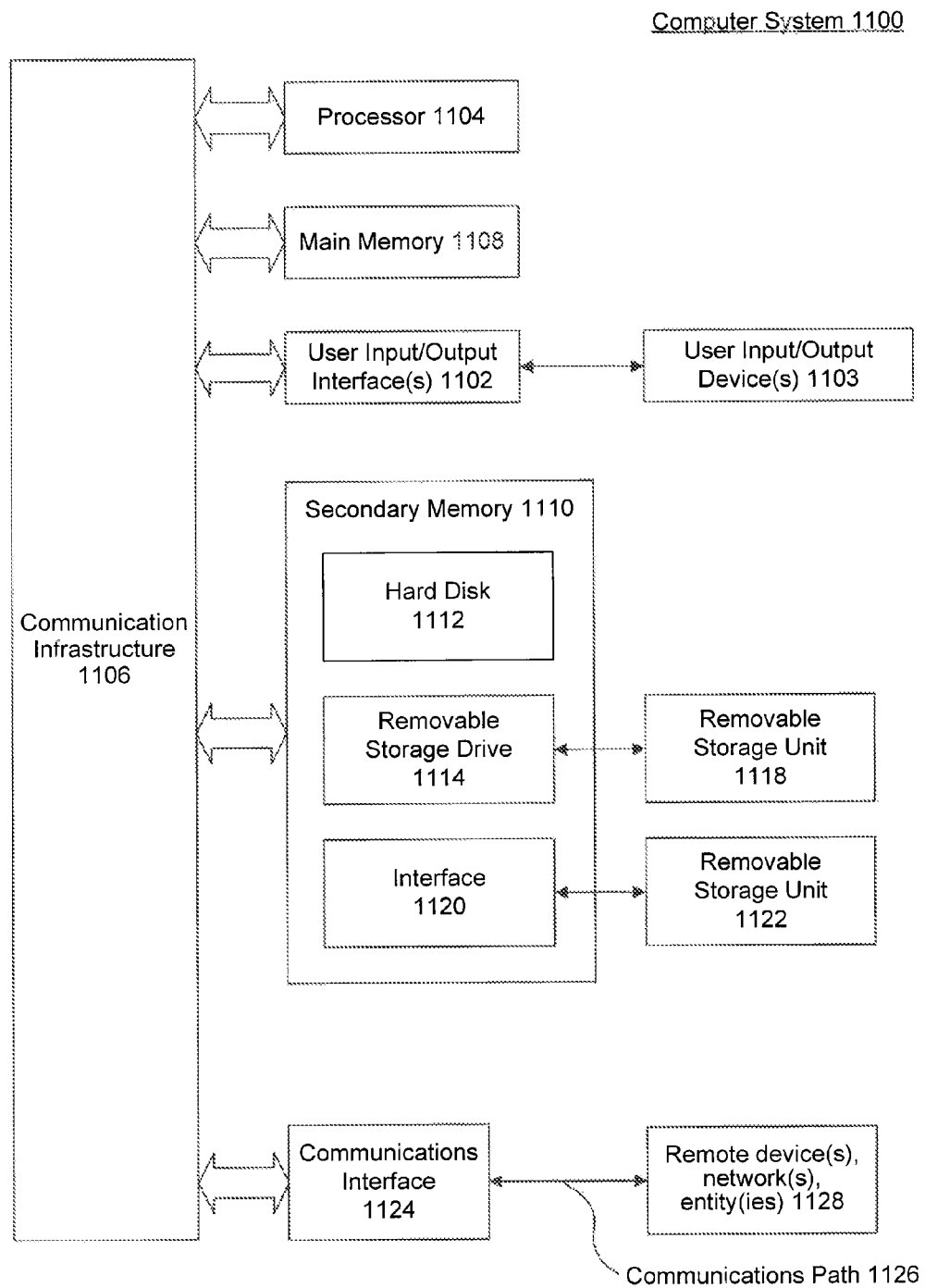

FIG. 11 is a block diagram of an example computer system in which embodiments may be implemented.

DETAILED DESCRIPTION

Provided herein are system, method and/or computer program product embodiments, and/or combinations and sub-combinations thereof, for generating cardinality estimates, where cardinality estimates are used for generating an optimal query plan for a query.

FIG. 1 is an example database computing environment 100 in which embodiments can be implemented. Computing environment 100 includes a database management system (DBMS) 140 and client 110 that communicates DBMS 140. DBMS 140 may be a system executing on a server and accessible to client 110 over a network, such as network 120, described below. Although client 110 is represented in FIG. 1 as a separate physical machine from DBMS 140, this is presented by way of example, and not limitation. In an additional embodiment, client 110 occupies the same physical system as DBMS 140. In a further embodiment, client 110 is a software application which requires access to DBMS 140. In another embodiment, a user may operate client 110 to request access to DBMS 140. Throughout this specification, the terms client and user will be used interchangeably to refer to any hardware, software, or human requestor, such as client 110, accessing DBMS 140 either manually or automatically. Additionally, both client 110 and DBMS 140 may execute within a computer system, such as an example computer system discussed in FIG. 11.

Client 110 and DBMS 140 may communicate over network 120. Network 120 may be any network or combination of networks that can carry data communications. Such a network 120 may include, but is not limited to, a local area network, metropolitan area network, and/or wide area network that include the Internet.

DBMS 140 receives a query, such as query 102, from client 110. Query 102 is used to request, modify, append, or otherwise manipulate or access data in database storage 150. Query 102 is transmitted to DBMS 140 by client 110 using syntax which conforms to a query language. In a non-limiting embodiment, the query language is a Structured Query Language ("SQL"), but may be another query language. DBMS 140 is able to interpret query 102 in accordance with the query language and, based on the interpretation, generate requests to database storage 150.

Query 102 may be generated by a user using client 110 or by an application executing on client 110. Upon receipt, DBMS 140 begins to process query 102. Once processed, the result of the processed query is transmitted to client 110 as query result 104.

To process query 102, DBMS 140 includes a parser 162, a normalizer 164, a compiler 166, and an execution unit 168.

Parser 162 parses the received queries 102. In an embodiment, parser 162 may convert query 102 into a binary tree data structure which represents the format of query 102. In other embodiments, other types of data structures may be used.

When parsing is complete, parser 162 passes the parsed query to a normalizer 164. Normalizer 164 normalizes the parsed query. For example, normalizer 164 eliminates redundant SQL constructs from the parsed query. Normalizer 164 also performs error checking on the parsed query that confirms that the names of the tables in the parsed query conform to the names of tables 180. Normalizer 164 also confirms that relationships among tables 180, as described by the parsed query, are valid.

Once normalization is complete, normalizer 164 passes the normalized query to compiler 166. Compiler 166 compiles the normalized query into machine-readable format. The compilation process determines how query 102 is executed by DBMS 140. To ensure that query 102 is executed efficiently, compiler 166 uses a query optimizer 170 to generate an access plan for executing the query.

Query optimizer 170 analyzes the query and determines a query plan for executing the query. The query plan retrieves and manipulates information in the database storage 150 in accordance with the query semantics. This may include choosing the access method for each table accessed, choosing the order in which to perform a join operation on the tables, and choosing the join method to be used in each join operation. As there may be multiple strategies for executing a given query using combinations of these operations, query optimizer 170 generates and evaluates a number of strategies from which to select the best strategy to execute the query.

In an embodiment, query optimizer 170 generates multiple query plans. Once generated, query optimizer 170 selects a query plan from the multiple query plans to execute the query. The selected query plan may be a cost efficient plan, a query plan that uses the least amount of memory in DBMS 140, a query plan that executes the quickest, or any combination of the above, to give a few examples.

In one embodiment, in order for query optimizer 170 to generate and select a query plan, DBMS 140 uses cardinality estimator 172. Cardinality estimator 172 generates an estimate of the size (i.e., number of rows) of a query plan before the query plan is executed. Based on cardinality estimates, query optimizer 170 costs and selects an efficient query plan that executes query 102 from multiple query plans.

Figure 2:
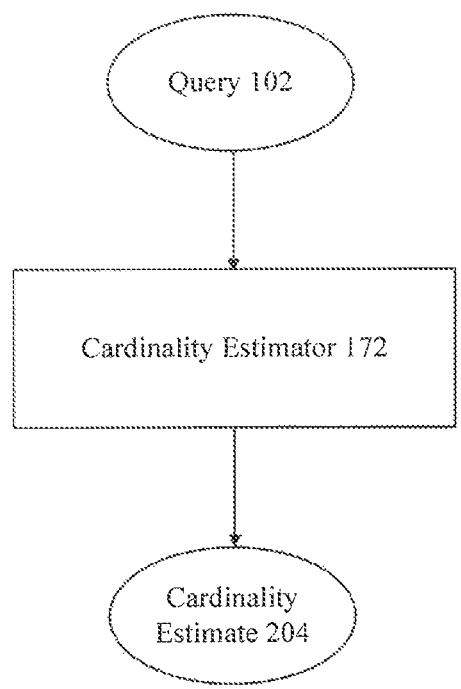
FIG. 2 is a block diagram of a cardinality estimator, according to an embodiment.

FIG. 2 is a block diagram 200 of a cardinality estimator, according to an embodiment. In block diagram 200, cardinality estimator receives query 102 as input and generates a cardinality estimate 204 as output.

Query 102, such as query Q accesses data in one or more tables. The one or more tables that are accessed using query Q may be represented as tables $R_i$, i=0 . . . n. In an embodiment, query Q that accesses tables $R_i$ may be presented as:

$$Q = \sigma_p(R_1 \bowtie \ldots \bowtie R_n)$$

In an embodiment, each table R has a set of attributes, denoted as attr(R). The list of attributes on a table R, may be represented as R[A], where the set of attributes $A \subseteq$ attr (R), $A = \{A_1, A_2, \ldots, A_n\}$.

In an embodiment, $R[A_1, A_2, \ldots, A_n]$ is a subset of attributes of table R, such as $A = \{A_1, \ldots, A_n\} \subseteq \text{attr}(R)$.

In an embodiment, query 102 also contains a predicate. A predicate is a condition that may be evaluated in query 102. In an embodiment, a predicate may be a join predicate. A join predicate is a predicate that specifies a join operation that links several tables together on a particular set of attributes when evaluated. An evaluated join predicate, typically returns a join table as a result. For example, a join predicate on tables T and S may be represented as equijoin predicates T[A]=S[A] where $A = \{A_1, \ldots, A_n\}$ are attributes based on which tables T and S are joined, such that $A \subseteq$ attr (T) and $A \subseteq$ attr (S). A short form for the join predicate T[A]=S[A] may be represented as the conjunct predicate $$\wedge_{k \in \{1, \ldots, n\}} (T[A_k] = S[A_k])$$

In an embodiment, to determine a cardinality estimate 204 for query 102, cardinality estimator 172 determines a cardinality estimate over join equivalence classes for a join predicate. A join equivalence class for a predicate may be non-constant or constant. A non-constant join equivalence class $\epsilon$ (p) for a join predicate $p = \wedge_{i,j \in \{1, \ldots, m\}, i \neq j} (R_i[A] = R_j[A])$ is defined as a set of attribute subsets participating in the join predicate $\epsilon(p) = (\{R_1[A], \ldots R_m[A]\})$, where $A = \{A_1, \ldots, A_n\}$ is a set of common attributes for tables $R_i$, $i \in \{1, \ldots, m\}$.

A constant join equivalence class c$\epsilon$(p) for a join predicate $p = (\wedge_{i,j \in \{1, \ldots, m\}, i \neq j} (R_i[A] = R_j[A])) \wedge (\wedge_{i \in \{1, \ldots, m\}, k \in \{1, \ldots, n\}} (R_i[A_k] = c_k))$ is defined as a tuple of a set of attribute subsets and a constant vector, such that c$\epsilon$(p)=({$R_1[A], \ldots, R_m[A]$}, ($c_1, \ldots, c_n$) where $A = \{A_1, \ldots, A_n\}$ is a set of common attributes for tables $R_i$, $i \in \{1, \ldots, m\}$. A person skilled in the art will appreciate that a tuple is an ordered set of elements, which is here an ordered set of a subset of attributes and a constant vector.

In an embodiment, cardinality estimator 172 may determine a cardinality estimate over a set of join equivalence classes. For example, given a set of join equivalence classes corresponding to the logical expression:

$$\sigma_{p(R1, \ldots, Rm)} R_1 \bowtie R_2 \bowtie \ldots \bowtie R_m$$

cardinality estimator 172 computes the cardinality estimation for a sub-expression involving relations $\{R_{i1}, \ldots R_{it}\} \subseteq \{R_1, \ldots, R_m\}$.

In an embodiment, to determine cardinality estimate 204 over a set of join equivalence classes, cardinality estimator 172 generates one or more undirected graphs. From the one or more undirected graphs, cardinality estimator 172 identifies minimum spanning tees that link the vertices of the undirected graph. A person skilled in the art will appreciate that a spanning tree of an undirected graph is a tree that connects all vertices in the undirected graph. Additionally, an edge in the undirected graph has assigned a weight which in the graphs corresponding to the join equivalence classes may represent the quality of the selectivity estimation of an edge.

To build an undirected graph G={V, E}, cardinality estimator 172 determines a set of vertices V (or nodes), where each node $R_i[A]$ represents a relation and the relation's attributes that are participating in the join equivalence class. In an embodiment, for a constant join equivalence class, cardinality estimator 172 generates an extra node for the constant vector ($c_1, \ldots c_n$) as discussed below. In an embodiment, cardinality estimator 172 also generates a set of edges E of the form ($R_i, R_j, (p_1, \ldots, p_n)$), for each join predicate ($p_1, \ldots, p_n$) between $R_i$ and $R_j$ In an embodiment, cardinality estimator 172 annotates each edge with one or more predicates that correspond to the join predicates between the two nodes of the edge.

To build an undirected graph for a constant join equivalence class c$\epsilon$(p)=({$R_1[A], \ldots, R_m[A]$}, ($c_1, \ldots, c_n$)) cardinality estimator 172 defines the graph of c$\epsilon$(p) as G(c$\epsilon$(p))={V, E}, where V is a set of vertices and E is a set of edges connecting the vertices. In an embodiment the set of vertices V are:

$$V = \{R_1[A], \ldots, R_m[S], (c_1, \ldots, c_n)\}$$

and the set of edges E, are:

$$E = \{(R_i[A], R_j[A], (R_i[A_1], \ldots, R_j[An] = R_m[An]))|i, j \in \{1, \ldots m\}\} \cup \{(R_i[A], (c_1, \ldots, c_n), (R_i[A_1] = c_1, \ldots, R_i[A_n] = c_n))|i \in \{1, \ldots m\}\}.$$

To build an undirected graph for a non-constant join equivalence class $\epsilon(p) = (\{R_1[A], \ldots, R_m[A]^*\})$, cardinality estimator 172 defines the graph of $\epsilon(p)$ as G($\epsilon(p)$)={V, E}, where V is a set of vertices and E is a set of edges connecting the vertices. In an embodiment the set of vertices V are:

$$V = \{R_1[A], \ldots, R_m[A]\}$$

And the set of edges E are:

$$E = \{(R_i[A], R_j[A], (R_i[A_1] = R_j[A_1], \ldots, R_i[A_n]))|i, j \in \{1, \ldots m\}\}.$$

FIG. 3A is an example graph generated using a cardinality estimator, according to an embodiment. In FIG. 3A, DBMS 140 receives query Q, such that:

$$Q = \sigma_p(R_1 \bowtie R_2 \bowtie R_3 \bowtie R_4 \bowtie R_5).$$

and where the predicate p includes multiple join predicates p1 to p21 at shown below:

$$p = \underbrace{(R5[A] = cA}_{p1} \wedge \underbrace{R5[B] = cB}_{p2} \wedge \underbrace{R1[A] = R5[A]}_{p3} \wedge$$

$$\underbrace{R1[B] = R5[B]}_{p4} \wedge \underbrace{R4[A] = cA}_{p5} \wedge \underbrace{R4[B] = cB}_{p6} \wedge \underbrace{R1[A] = cA}_{p7} \wedge$$

$$\underbrace{R1[B] = cB}_{p8} \wedge \underbrace{R1[A] = R4[A]}_{p9} \wedge \underbrace{R1[B] = R4[B]}_{p10} \wedge \underbrace{R4[A] = R5[A]}_{p11} \wedge$$

$$\underbrace{R4[B] = R5[B]}_{p12} \wedge \underbrace{R1[A] = R3[A]}_{p13} \wedge \underbrace{R3[A] = R5[A]}_{p14} \wedge$$

$$\underbrace{R2[A] = R5[A]}_{p15} \wedge \underbrace{R2[A] = cA}_{p16} \wedge \underbrace{R2[A] = R4[A]}_{p17} \wedge$$

$$\underbrace{R1[A] = R2[A]}_{p18} \wedge \underbrace{R3[A] = cA}_{p19} \wedge \underbrace{R2[A] = R3[A]}_{p20} \wedge \underbrace{R3[A] = R4[A]}_{p21})$$

Based on the above query Q, cardinality estimator 172 generates one constant equivalence class to the predicate p', where:

$$p' = ((\wedge_{i,j \in \{1,4,5\}}(R_i[A,B] = R_j[A,B]) \wedge (\wedge_{i,j \in \{1,4,5\}}(R_i[A] = cA \wedge R_i[B] = cB))$$

and the constant equivalence class ce(p') is:

$$c\epsilon(p') = \{R_1[A,B], R_4[A,B], R_5[A,B], (cA, cB)\}$$

Cardinality estimator 172 then represents the constant equivalence class ce(p') as graph G1=(V$_1$, E$_1$) where:

---

V$_1$ = {R$_1$[A,B], R$_4$[A,B], R$_5$[A,B], (cA; cB)}
and
E$_1$ = {
  (R$_1$[A,B], R$_4$[A,B], (p9;p10)), (R$_1$[A,B], R$_5$[A,B], (p3; p4)),
  (R$_1$[A,B], (cA, cB), (p7; p8)),
  (R$_4$[A,B], R$_5$[A,B], (p11; p12)), (R$_4$[A,B], (cA, cB), (p5; p6)),
  (R$_5$[A,B], (cA, cB), (p1; p2))
}

---

Graph G1(V$_1$, E$_1$), including the vertices V$_1$ and edges E$_1$ described above is illustrated in diagram 300A in FIG. 3A. Graph G1 is a graph showing a constant equivalence class for the predicate p'. Additionally, FIG. 3A also includes a listing of predicates p1 to p12 that comprise predicate p' that defines the edges in graph G1.

In an embodiment, cardinality estimator 172 also generates a second equivalence class that corresponds to a predicate p", where:

$$p'' = ((\wedge_{i,j \in \{1,2,3,4,5\}}(R_i[A] = R_j[A])) \wedge (\wedge_{j \in \{1,2,3,4,5\}}(R_i[A] = cA))$$

and where the constant equivalence class ce(p") is:

$$c\epsilon(p'') = \{R_1[A], R_2[A], R_3[A], R_4[A], R_5[A], (cA)\}$$

Cardinality estimator 172 then represents the constant equivalence class ce(p") as graph G2=(V$_2$, E$_2$) where:

---

V$_2$ = {R$_1$[A], R$_2$[A], R$_3$[A], R$_4$[A], R$_5$[A], (cA)}
and
E$_2$ = {
  (R$_1$[A], R$_2$[A],(p18)), (R$_1$[A], R$_3$[A], (p13)),
  (R$_1$[A] ,R$_4$[A], (p9));
  (R$_1$[A], (R$_5$[A], (p3), (R$_1$[A], (cA, (p7)),
  (R$_2$[A], R$_3$[A], (p20)), (R$_2$[A], R$_4$[A], (p17)), (R$_2$[A], R$_5$[A], (p15)), (R$_2$[A], (cA), (p16)),
  (R$_3$[A], R$_4$[A], (p21)), (R$_3$[A], R$_5$[A], (p14)),
  (R$_3$[A], (cA), (p19)),
  (R$_4$[A], R$_5$[A], (p11)), (R$_4$[A], (cA), (p5)),
  (R$_5$[A], (cA); (p1))
}

---

Graph G2(V$_2$, E$_2$), including the vertices V$_2$ and edges E$_2$ described above is also illustrated in FIG. 3A. Graph G2 is a diagram of a constant equivalence class for the predicate p". Additionally, FIG. 3A also includes a listing of predicates p1 to p21 that comprise predicate p" and defines edges in graph G2.

Once, cardinality estimator 172 generates graphs for equivalence classes, such as example graphs G1 and G2 for example query Q, cardinality estimator 172 determines the spanning trees in the graphs. From the spanning trees, cardinality estimator 172 determines the minimum spanning tree and calculates the cardinality estimate from the minimum spanning tree as discussed below.

As shown in FIG. 3A, there may exist a predicate pi which annotates more than one edge in equivalence graphs corresponding to a query Q. For example, the predicate p5 annotates the edge (R$_4$[A, B], c(A, cB), (p5, p6)) in graph G1 and the edge (R$_4$[A], c(A), (p5)) in graph G2. When cardinality estimator 172 determines a cardinality estimate, cardinality estimator 172 generates a cardinality estimate based on a subset S of the join predicates representing some relationships of the relations {R$_1$, . . . R$_n$} that forms spanning trees. In an embodiment, cardinality estimator 172 excludes redundant (or repeating) predicates from the spanning tree.

For example, let a spanning tree T(G) be a tree in the fully connected, undirected graph G, that includes all vertices of graph G. In this case, a graph G having n vertices has $n^{(n-2)}$ such spanning trees T(G). FIG. 3B is a diagram 300B of the example spanning tress of graphs G1 and G2, according to an embodiment. The dashed lines between the nodes in graphs G1 and G2 indicate the edges that are included in the spanning trees for graphs G1 and G2. The subset of predicates that are included in the spanning tree for graphs G1 and G2 are p5, p6, p7, p8, p11, p12, p14 and p20, as shown in bold in FIG. 3B.

To determine a spanning tree from a join equivalence graphs, such as G1 and G2, cardinality estimator 172 sets T(G(ε(p))) as a spanning tree of G(ε(p)). The predicates in the spanning tree T(G(ε(p))) can be defined as a set of predicates annotating the edges in the spanning tree T(G(ε(p))). For example, predicates can be defined as:

$$\text{Preds}(T(G(\epsilon(p)))) = \{p_i(v_1, v_2, (p_1, \ldots, p_n)) \text{ an edge in } T(G(\epsilon(p)))\}$$

In an embodiment, cardinality estimator 172 applies the following theorem to calculate cardinality estimation for query Q. If T(G(ε(p))) is a spanning tree of G(ε(p)), then the conjunct generated by the spanning tree infers the original predicate p, such as:

$$(\wedge_{c \in Preds(T(G(\epsilon(p))))} c) \Rightarrow p$$

Also, any predicate $q\epsilon\{p, |v_1, v_2, (p_1, \ldots, p_n)$ an edge in $G(\Sigma(p))\}$ is inferred by the conjunct generated by the spanning tree:

$$(\wedge_{c\epsilon Preds(T(G(\epsilon(p))))} C) \Rightarrow q$$

Based on the theorem above, cardinality estimator 172 determines that a query Q, such as:

$$Q = \sigma_s(R_1 \bowtie \ldots \bowtie R_n)$$

where a predicate s has e equivalent classes $\{\epsilon(s_1), \ldots, \epsilon(s_e)\}$ is equivalent to a query Q' for which the predicate s was replaced with the predicates of a spanning trees induced by $\{T(G(\epsilon(s_1))), \ldots, T(G\epsilon(s_e))\}$.

Applying the theorem above, let $\{T(G(\epsilon(s_1))), \ldots, T(G\epsilon(s_e)))\}$ be spanning trees of a forest for graphs $\{(G(\epsilon(s_1))), \ldots, G\epsilon(s_e))\}$. In an embodiment, predicates of the forest for the graphs of join equivalence classes are predicates that annotate the spanning trees, with duplicates removed, such as:

$$Preds(\{T(G(\epsilon(s_1)))\} = \cup_{i \epsilon \{1, \ldots, e\}}^d (Preds(\{T(G(\epsilon(s_j))))))$$

where cardinality estimator 172 uses operation $\cup^d$ to remove duplicate predicates.

In an embodiment, cardinality estimator 172 rewrites query Q using the predicates in the forest of join equivalence classes $Preds(\{T(G(\epsilon(s_1))), \ldots, T(G\epsilon(s_e)))\})$, such as:

$$Q_o = \sigma_s(R_1 \bowtie \ldots \bowtie R_n) = \sigma_{\wedge_{c \in Preds(\{T(G(\epsilon(s1))), \ldots, T(G(\epsilon(se))))\}} c}$$

$$((R_1 \bowtie \ldots \bowtie R_n)$$

In an embodiment, based on the theorem above, cardinality estimator 172 determines a cardinality estimate for query $Q_0$ where:

$$Q_0 = \sigma_x(R_1 \bowtie \ldots \bowtie R_n)$$

by first rewriting the predicate x such that:

$$Q_0 = \sigma_{x'}(\underbrace{(\sigma_s(R_1 \bowtie \ldots \bowtie R_n)}_{Q})$$

where cardinality estimator 172 can split predicates into e join equivalence classes.

Cardinality estimator 172 then determines the cardinality of query $Q_0$. To determine cardinality of query $Q_0$, cardinality estimator 172 first determines the selectivity estimate of query Q using the spanning trees for the join predicate s referred to as selectivity(s). Cardinality estimator 172 then uses selectivity(s) to selectivity(x') and the cardinalities of the relations R, to compute card($Q_0$), as illustrated below:

$$card(Q_0) = f(selectivity(s), selectivity(x'), cardinality(R_1), \ldots, cardinality(R_n))$$

In an embodiment, selectivity(s)=STSelectivity(Q) and can be computed using an algorithm in FIG. 8, according to an embodiment.

When cardinality estimator 172 applies the above algorithm to graphs G1 and G2 shown in FIGS. 3A and 3B, cardinality estimator 172 generates cardinality estimate 204 for query Q associated with graphs G1 and G2 as:

Cardinality Estimate=sel($p5 \wedge p6$)×sel($p7 \wedge p8$)×sel($p11 \wedge p12$)×sel($p20$)×sel($p14$)

FIG. 4 is a flowchart of a method 400 of a cardinality estimator generating a cardinality estimate for a query Q, according to an embodiment. Method 400 can be performed by processing logic that can comprise hardware (e.g., circuitry, dedicated logic, programmable logic, microcode, etc.), software (e.g., instructions run on a processing device), or a combination thereof. In one implementation, the method 400 is performed by cardinality estimator 172.

At operation 402, the cardinality estimator receives a query Q. For example, cardinality estimator 172 receives query Q, where query $Q = \sigma_s(R_1 \bowtie \ldots \bowtie R_n)$ and the predicate s can be split into e equivalent classes.

At operation 404, the cardinality estimator determines the minimum set of equivalence classes. For example, cardinality estimator 172 determines e equivalence classes $\{\epsilon(s_1), \ldots, \epsilon(s_e)\}$. As discussed above, equivalence classes are determined based on sets of common attributes that are included in tables joined in query Q.

At operation 406, the cardinality estimator generates join equivalence graphs based on the minimum set of equivalence classes. For example, cardinality estimator 172 generates a forest of join equivalence graphs, each graph corresponding to a join equivalence class $\epsilon(s_i)$, where i=1 to e.

At operation 408, the cardinality estimator determines the minimum spanning tress for cardinality estimation. For example, in the join equivalence graphs, the edges represent predicate attributes, where each edge has a weight computed by DBMS 140. In an embodiment, the weight for an edge representing a join predicate between two tables is a property vector of the edge, including, for example, the confidence level of the selectivity estimation for an edge; the quality of the selectivity estimation expressed as the properties of the join predicates. Such properties may include a type of relationship between the two tables. Example properties include, if the join predicate is of the form "primary key primary key", "primary key=foreign key", "foreign key=foreign key", "unique constraint attributes=attributes", or "index attributes attributes". When comparing the weights of two edges (during minimum spanning trees building) a function which compares the two property vectors of the edges can be used, according to an embodiment.

In an embodiment, cardinality estimator 172 determines the minimum spanning trees as the trees that include all vertices in the join equivalence graphs, such that the nodes of the graphs are connected using the edges associated with the lowest weights. In an embodiment, cardinality estimator 172 defines the spanning trees as $\{T(G(\epsilon(s_1))), \ldots, T(G\epsilon(s_e)))\}$.

At operation 410, the cardinality estimator uses the predicate associated with the spanning trees to determine the cardinality estimate for query Q. For example, cardinality estimator 172 determines the cardinality estimate for query Q based on the predicates associated with edges of the minimum spanning trees determined in operation 408 and multiplied by the selectivity of these predicate, such as:

$$selectivity(s) = \Pi_{e \in Edges(\{T(G(\epsilon(s_1))), \ldots, T(G(E(s_e))))\})} selectivity(e))$$

Once cardinality estimator 172 determines a cardinality estimate 204 for query Q, query optimizer 170 uses cardinality estimate 204 to determine a query plan from query Q.

In an embodiment, cardinality estimator 172 also determines a cardinality estimate for a sub-expression of query Q, such as sub-expression Q'. FIG. 5 is a flowchart of a method 500 of a cardinality estimator generating a cardinality estimate for a sub-section Q' of query Q, according to an embodiment. Method 500 can be performed by processing logic that can comprise hardware (e.g., circuitry, dedicated logic, programmable logic, microcode, etc.), software (e.g., instructions run on a processing device), or a combination thereof. In one implementation, the method 500 is performed by cardinality estimator 172.

At operation 502, the cardinality estimator receives a query Q. For example, cardinality estimator 172 receives query Q, where query $Q=\sigma_s(R_1 \bowtie \ldots \bowtie R_n)$ and the predicate s can be split into e equivalent classes.

At operation 504, the cardinality estimator receives a subset of tables. For example, cardinality estimator 172 receives a subset of tables that query Q manipulates, such as $\{Ri_1), \ldots, Ri_t\} \cup \{Ri, \ldots, Rn\}$.

At operation 506, the cardinality estimator determines the equivalence classes. For example, cardinality estimator 172 determines e equivalence classes $\{\epsilon(s_1), \ldots, \epsilon(s_e)\}$. As discussed above, equivalence classes are determined based on sets of common attributes that are included in tables joined in query Q.

At operation 508, the cardinality estimator generates join equivalence graphs. For example, cardinality estimator 172 generates a forest of join equivalence graph for each join equivalence class $\epsilon(s_i)$, where i=1 to e.

At operation 510, the cardinality estimator determines the sub-graphs from the join equivalence graphs that include the subset of tables. For example, for each graph $G(\epsilon(s_i))$, cardinality estimator 172 determines the vertex induced sub-graph $G'(\epsilon(s_i))$, where the vertex induced sub-graph $G'(\epsilon(s_i))$ includes only vertices $\{Ri_1, \ldots, Ri_t\}$. In an embodiment, cardinality estimator 172 represents the join equivalence sub-graphs as $\{G'(\epsilon(s_1)), \ldots, G'\epsilon(s_e))\}$.

At operation 512, the cardinality estimator determines the minimum spanning tress for cardinality estimation. For example, in the join equivalence sub-graphs $\{G'(\epsilon(s_1)), \ldots, G'\epsilon(s_e))\}$, the edges represent predicate attributes, where each predicate attribute has a weight specified by DBMS 140 as described above. In an embodiment, cardinality estimator 172 determines the minimum spanning trees as the trees that include all vertices in the join equivalence sub-graphs $G'(\epsilon(s_i))$, such that the nodes of the graphs are connected using the edges associated with the lowest weights. In an embodiment, cardinality estimator 172 defines the spanning trees as $\{T(G(C(s_1))), \ldots, T(G\epsilon(s_e)))\}$.

At operation 514, the cardinality estimator uses the predicate associated with the spanning trees to determine the cardinality estimate for sub-query Q'. For example, cardinality estimator 172 determines the selectivity estimation for sub-query Q' based on the edges associated with the best spanning trees determined in operation 512 and multiplied by the selectivity of the predicate, such as:

$$\text{selectivity}(s')=\Pi_{e \in Edges(\{T(G'(\epsilon(s_1))), \ldots, T(G'(\Sigma(s_e)))\})} \text{selectivity}(e))$$

FIG. 6 is a diagram of an algorithm 600 for computing the cardinality of a query, according to an embodiment. Algorithm 600 may be implemented by cardinality estimator 172 to generate a cardinality estimate 204. Once cardinality estimator 172 receives query $Q_0=\sigma_x(R_1 \bowtie \ldots \bowtie R_n)$, cardinality estimator 172 uses algorithm 600 to rewrite the predicate x to infer new predicates that complete join equivalence classes, such that $Q_0=\sigma_x(\sigma_s(R_1 \bowtie \ldots \bowtie R_n))$, where $Q=\sigma_s(R_1 \bowtie \ldots \bowtie R_n)$, and predicate s of query Q is split into e join equivalence classes. Algorithm 600 then uses algorithms 700-1000 discussed in FIGS. 7-10 to generate cardinality estimate 204 for query Q.

Selectivity estimation for Q is computed by algorithm 800 (STSelectivity(Q) call). Algorithm 600 uses this new selectivity estimation and other estimates to compute the final cardinality estimation for the whole query $Q_0$ (at line 3).The cardinality estimate is card($Q_0$) is computed as:

$$\text{card}(Q_0)=f(\text{selectivity}(s),\text{selectivity}(x'),\text{cardinality}(R1), \ldots, \text{cardinality}(Rn)).$$

FIG. 7 is diagram of an algorithm 700 for determining join equivalence classes for a query, according to an embodiment. as required by cardinality estimator 172 during operations 404 and 506

As discussed above, cardinality estimator 172 determines join equivalence classes for a predicate. The input to algorithm 700 is a query Q, such as:

$$Q=\sigma_s(R_1 \bowtie \ldots \bowtie R_n)$$

which can be decomposed into one or more equivalence classes. In an embodiment, the output of algorithm 700 is a minimum set of equivalence classes, such as such as $\{\epsilon(s_1), \ldots, \epsilon(s_e)\}$. The details of algorithm 700 are included in FIG. 7.

FIG. 8 is a diagram of an algorithm 800 for computing a selectivity estimate for using spanning trees for a query used by cardinality estimator 172 during operation 204, according to an embodiment. The input to algorithm 800 is a query Q, such as:

$$Q=\sigma_s(R_1 \bowtie \ldots \bowtie R_n)$$

The output of algorithm 800 is selectivity of a predicate s. In an embodiment, algorithm 800 uses algorithm 700 to generate a minimum set of the equivalence classes, such as set $\{\epsilon(s_1), \ldots, \epsilon(s_e)\}$, at step 1. From the minimum set of the equivalence classes, cardinality estimator 172 generates graphs $\{G(\epsilon(s_1))), \ldots, G\epsilon(s_e))\}$, one graph for each equivalence class, at step 2. Cardinality estimator 172 then uses algorithm 1000 to generate minimum spanning trees $\{T(G(\epsilon(s_1))), \ldots, T(G\epsilon(s_e)))\}$ from the graphs $\{G(\epsilon(s_1))), G(\epsilon(s_e))\}$, at step 3. At step 4, cardinality estimator uses the minimum spanning trees $\{T(G(\epsilon(s_1))), \ldots, T(G\epsilon(s_e)))\}$ to determine selectivity for predicate s.

FIG. 9 is a diagram of an algorithm 900 for computing the selectivity estimate for using spanning trees for a sub-query, according to an embodiment. The first input to algorithm 900 is a query Q, such as:

$$Q=\sigma_s(R_1 \bowtie \ldots \bowtie R_n)$$

The second input to algorithm 900 is a subset of tables of tables in a query Q, such as:

$$\{R_{i1}, \ldots, R_{it}\} \subseteq \{R_1, \ldots, R_n\}.$$

The output of algorithm 900 is an estimated selectivity of a sub-predicate s', where s' includes predicates on the subset $\{R_{i1}, \ldots, R_{it}\}$. In an embodiment, algorithm 900 uses algorithm 700 to generate a minimum set of the equivalence classes, such as set $\{\epsilon(s_1), \ldots, \epsilon(s_e)\}$, at step 1. From the minimum set of the equivalence classes, cardinality estimator 172 generates graphs $\{G(\epsilon(s_1))), \ldots, G\epsilon(s_e))\}$, one graph for each equivalence class, at step 2. Cardinality estimator 172 then computes a vertex induced sub-graph $G'(\Sigma(s_i))$ for vertices of a subset of tables $\{R_{i1}, \ldots R_{it}\}$, at step 3. At step 4, cardinality estimator 172 determines, using the algorithm 1000, the minimum spanning trees $\{T(G'(\epsilon(s_1))), \ldots, T(G'(\epsilon(s_e)))\}$ from the new forest of sub-graph $\{G'(\epsilon(s_1)), \ldots, G'(\epsilon(s_e))\}$. At step 5, cardinality estimator 172 uses the minimum spanning trees $\{T(G'(\epsilon(s_1)), \ldots,$ T(G'(ϵ(s_e)))} to determine selectivity for predicate s' for a sub-predicate s', such as:

$$selectivity(s')=\Pi_{e \in Edges(\{T(G'(\epsilon(s_1))), \ldots, T(G'(\epsilon(s_e)))\})} selectivity(e))$$

FIG. 10 is a diagram of an algorithm 1000 for computing the minimum spanning trees, as required by cardinality estimator 172 during operations 408 and 512, for a graph forest of join equivalence classes, according to an embodiment. As discussed above, the edges in the graph, such as graph {G(ϵ(s_i))), . . . , G(ϵ(s_e))}, have different weights. Cardinality estimator 172 may assign the weights to the edges based on a pre-configured criteria in DBMS 140. In an embodiment, cardinality estimator 172 may evaluate the weights to the edges based on a betterQuality($e_i$, $e_j$) function which compares the two edges $e_i$, $e_j$, and determine the quality of the edge for inclusion into a minimum spanning tree. The betterQuality($e_i$, $e_j$) function is included as part of algorithm 1000. Based on the quality of edges as determined by the weights, cardinality estimator 172 generates the minimum spanning trees from the forest of graphs {G(ϵ(s_1))), . . . , G(ϵ(s_e))}.

In an embodiment, the input to algorithm 1000 is the forest of graphs generated by the minimum set of join equivalence classes for query Q, such as, minϵ(Q)={G(ϵ(s_1)), . . . , G(ϵ(s_e))}. The output of algorithm 1000 is a set of best spanning trees {T((ϵ(s_1))), . . . , T(G(ϵ(s_e)))}

In an embodiment, cardinality estimator 172 identifies the edges in the forest of graphs {G(ϵ(s_1))), . . . , G(ϵ(s_e))} in a set E, where E may be defines as:

$$E=\cup_{i \in \{1, ldots\ e\}} Edges(G(\epsilon(s_i)))$$

Cardinality estimator 172 then uses algorithm 1000 to traverse though the edges using better Quality($e_i$, $e_j$) function, and compare the edges in set E. When cardinality estimator 172 identifies an edge using better Quality($e_i$, $e_j$) function, such as the edge having a lowest weight, algorithm 1000 adds the edge to a set of edges that together form the minimum spanning trees. In an embodiment, algorithm 1000 includes an add(d) function, where d is the edge identified using the betterQuality($e_i$, $e_j$) function that cardinality estimator 172 attempts to add to the minimum spanning trees. The add(d) function is discussed in detail in FIG. 10.

Various embodiments can be implemented, for example, using one or more well-known computer systems, such as computer system 1100 shown in FIG. 11. Computer system 1100 can be any well-known computer capable of performing the functions described herein, such as computers available from International Business Machines, Apple, Sun, HP, Dell, Sony, Toshiba, etc.

Computer system 1100 includes one or more processors (also called central processing units, or (CPUs), such as a processor 1104. Processor 1104 is connected to a communication infrastructure or bus 1106.

One or more processors 1104 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1100 also includes user input/output device(s) 1103, such as monitors, keyboards, pointing devices, etc., which communicate with communication infrastructure 1106 through user input/output interface(s) 1102.

Computer system 1100 also includes a main or primary memory 1108, such as random access memory (RAM). Main memory 1308 may include one or more levels of cache. Main memory 1108 has stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to an exemplary embodiment, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may farther include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

In an embodiment, a tangible apparatus or article of manufacture comprising a tangible computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use the embodiments using data processing devices, computer systems and/or computer architectures other than that shown in FIG. 11. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments as contemplated by the inventor(s), and thus, are not intended to limit the embodiments or the appended claims in any way.

While the embodiments has been described herein with reference to exemplary embodiments for exemplary fields and applications, it should be understood that the embodiments are not limited thereto. Other embodiments and modifications thereto are possible, and are within the scope and spirit of the embodiments. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the embodiments should not be limited by any of the above-described exemplary embodiments, but should be defined only in accordance with the following claims and their equivalents.

What is claimed is:

1. A computer-implemented method for generating a cardinality estimate, comprising:
    identifying a predicate in a query, wherein the predicate is split into a plurality of equivalence classes;
    generating a plurality of undirected equivalence graphs from the plurality of equivalence classes, wherein the undirected equivalence graphs include a plurality of weighted edges representing a join predicate between two tables, and wherein the equivalence classes are determined based on sets of common attributes that are included in tables joined in the query;
    identifying spanning trees in the plurality of undirected equivalence graphs;
    determining a minimum spanning tree of the identified spanning trees;
    calculating a cardinality estimate based on the minimum spanning tree based on multiplying each predicate, in a set of identified predicates in the spanning tress, by a selectivity associated with each edge corresponding to the predicate, wherein a quality of the selectivity indicates a relationship between two tables joined in the query, and wherein the relationship indicates at least one of a key or attribute relationship between the two tables; and
    selecting a query plan corresponding to the cardinality estimate, wherein the cardinality estimate for the selected query plan is associated with a lower consumption of resources amongst a plurality of query plans in an execution of a query by a processor.

2. The computer-implemented method of claim 1, wherein an equivalence class in the plurality of the equivalence classes shares a set of attributes common to the plurality of tables.

3. The computer-implemented method of claim 1, wherein an equivalence class in the plurality of the equivalence classes comprises a constant vector.

4. The computer-implemented method of claim 1, wherein generating an undirected equivalence graph in the plurality of undirected equivalence graphs, further comprises:
    generating a first node and a second node, wherein the first node corresponds to a first table and a set of attributes and the second node corresponds to a second table and a set of attributes, wherein the first table, the second table and the attributes are included in an equivalence class from the plurality of the equivalence classes;
    generating an edge between the first node and the second node; and
    annotating the edge with a second predicate referencing the attributes between the first node and the second node, wherein the second predicate is a component of the query predicate.

5. The computer-implemented method of claim 4, wherein generating the undirected equivalence graph further comprises:
    generating a third node including a constant vector;
    generating a second edge between a first node and a third node; and
    annotating the second edge with a third predicate referencing the attributes between the second table and the constant vector, wherein the third predicate is a component of the query predicate.

6. The computer-implemented method of claim 1, further comprising:
    determining a confidence level of the selectivity of at least one of the edges, wherein the confidence level is the weight of at least one of the edges.

7. The computer-implemented method of claim 1, wherein the minimum spanning tree comprises one or more trees that include all vertices in a join equivalence undirected graph, wherein nodes of the join equivalence undirected graph is connected using edges with the lowest weights.

8. A system for generating a cardinality estimate, comprising:
    a memory; and
    a processor coupled to the memory and configured to:
        identify a predicate in a query, wherein the predicate is split into a plurality of equivalence classes;
        generate a plurality of undirected equivalence graphs from the plurality of equivalence classes, wherein the undirected equivalence graphs include a plurality of weighted edges representing a join predicate between two tables, and wherein the equivalence classes are determined based on sets of common attributes that are included in tables joined in the query;

identify spanning trees in the plurality of undirected equivalence graphs;

determine a minimum spanning tree of the identified spanning trees;

calculate a cardinality estimate based on the minimum spanning tree based on multiplying each predicate, in a set of identified predicates in the spanning tress, by a selectivity associated with each edge corresponding to the predicate, wherein a quality of the selectivity indicates a relationship between two tables joined in the query, and wherein the relationship indicates at least one of a key or attribute relationship between the two tables; and select a query plan corresponding to the cardinality estimate wherein the cardinality estimate for the selected query plan is associated with a lower consumption of resources amongst a plurality of query plans in an execution of a query by the processor.

9. The system of claim 8, wherein an equivalence class in the plurality of equivalence classes shares a set of attributes common to the plurality of tables.

10. The system of claim 8, wherein an equivalence class in the plurality of equivalence classes comprises a constant vector.

11. The system of claim 8, wherein to generate an undirected equivalence graph in the plurality of the undirected equivalence graphs, the processor is further configured to:

generate a first node and a second node, wherein the first node corresponds to a first table and a set of attributes and the second node corresponds to a second table and a set of attributes, wherein the first table, the second table and the attributes are included in an equivalence class in the plurality of equivalence classes;

generate an edge between the first node and the second node; and annotate the edge with a second predicate referencing the attribute between the first node and the second node; wherein the second predicate is a component of the query predicate.

12. The system of claim 11, to generate the undirected equivalence graph, the processor is further configured to:

generate a third node including a constant vector;

generate a second edge between a first node and a third node; and annotate the second edge with a third predicate referencing the attributes between the second table and the constant vector, wherein the third predicate is a component of the query predicate.

13. A non-transitory computer-readable storage device having instructions stored thereon that, when executed by at least one computing device, causes the at least one computing device to perform operations that generate a cardinality estimate, the operations comprising:

identifying a predicate in a query, wherein the predicate is split into a plurality of equivalence classes, generating a plurality of undirected equivalence graphs from the plurality of equivalence classes, wherein the undirected equivalence graphs include a plurality of weighted edges representing a join predicate between two tables, and wherein the equivalence classes are determined based on sets of common attributes that are included in tables joined in the query;

identifying spanning trees in the plurality of undirected equivalence graphs;

determining a minimum spanning tree of the identified spanning trees;

calculating a cardinality estimate based on the minimum spanning tree based on multiplying each predicate, in a set, of identified predicates in the spanning tress, by a selectivity associated with each edge corresponding to the predicate, wherein a quality of the selectivity indicates a relationship between two tables joined in the query, and wherein the relationship indicates at least one of a key or attribute relationship between the two tables; and selecting a query plan corresponding to the cardinality estimate wherein the cardinality estimate for the selected query plan is associated with a lower consumption of resources amongst a plurality of query plans in an execution of a query by a processor of the at least one computing device.

14. The non-transitory computer-readable storage device of claim 13, wherein the query manipulates data in a plurality of tables, wherein a table includes a plurality of attributes.

15. The tangible computer-readable device of claim 13, wherein an equivalence class in the plurality of equivalence classes shares a set of attributes common to the plurality of tables.

16. The non-transitory tangible computer-readable storage device of claim 13, wherein generating an undirected equivalence graph in the plurality of undirected equivalence graphs, further comprises operations comprising: generating a first node and a second node, wherein the first node corresponds to a first table and a set of attributes and the second node corresponds to a second table and a set of attributes, wherein the first table, the second table and the attributes are included in an equivalence class from the plurality of the equivalence classes;

generating an edge between the first node and the second node, and annotating the edge with a second predicate referencing the attributes between the first node and the second node, wherein the second predicate is a component of the query predicate.

* * * * *